(12) United States Patent
Lawrence et al.

(10) Patent No.: US 6,922,184 B2
(45) Date of Patent: Jul. 26, 2005

(54) FOOT ACTIVATED USER INTERFACE

(75) Inventors: Richard Anthony Lawrence, Sodbury (GB); David Neil Slatter, Bristol (GB); Glenn Peter Hall, Stroud (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 10/098,293

(22) Filed: Mar. 18, 2002

(65) Prior Publication Data

US 2002/0180695 A1 Dec. 5, 2002

(30) Foreign Application Priority Data

Jun. 4, 2001 (GB) .............................................. 0113561

(51) Int. Cl.⁷ ................................................. G09G 5/00
(52) U.S. Cl. ..................................................... 345/156
(58) Field of Search ................................. 345/155–164, 345/629, 152, 165, 167; 600/300; 341/22; 708/139; 361/181; 707/501

(56) References Cited

U.S. PATENT DOCUMENTS

| | | | |
|---|---|---|---|
| 4,945,305 A | 7/1990 | Blood | 324/207.17 |
| 5,373,651 A | 12/1994 | Wood | 36/114 |
| 5,578,813 A | 11/1996 | Allen et al. | 250/208.1 |
| 5,781,913 A * | 7/1998 | Felsenstein et al. | 345/169 |
| 5,838,305 A * | 11/1998 | Bookstein | 345/163 |
| 5,864,333 A | 1/1999 | O'Heir | 345/157 |
| 5,886,685 A | 3/1999 | Best | 345/163 |
| 5,907,318 A | 5/1999 | Medina | 345/163 |
| 6,167,413 A * | 12/2000 | Daley, III | 708/139 |
| 6,400,996 B1 * | 6/2002 | Hoffberg et al. | 700/83 |
| 6,527,711 B1 * | 3/2003 | Stivoric et al. | 600/300 |
| 6,600,477 B1 * | 7/2003 | Howell | 345/157 |
| 6,748,316 B2 * | 6/2004 | Takayama et al. | 701/200 |
| 2002/0024675 A1 * | 2/2002 | Foxlin | 356/620 |
| 2002/0030661 A1 * | 3/2002 | Gemunder et al. | 345/156 |
| 2002/0044152 A1 * | 4/2002 | Abbott et al. | 345/629 |
| 2002/0105446 A1 * | 8/2002 | Mehring | 341/22 |
| 2003/0171190 A1 * | 9/2003 | Rice | 482/57 |

OTHER PUBLICATIONS

Tech Connections: P.D3: "Foot–Operated Mouse", Center for Rehabilitation Technology, pp. 1 and 2, http://www.tech-connections.org/products/computer/mouse/footmouse.html.
"Nohands Mouse": Picture, p. 1, http://www.footmouse.com/picture.htm.
"The Stealth Footmouse", p. 1, http://www.wwdir.com/footmouse.

* cited by examiner

Primary Examiner—Amare Mengistu
Assistant Examiner—Prabnodh Dharia
(74) Attorney, Agent, or Firm—Foley & Lardner LLP

(57) ABSTRACT

A computing apparatus comprises a processor unit 10 and a foot control unit 13, in addition to a device for presenting information to a user such as a microdisplay. Movement of the foot, which drives operation of a selection element, provides user input to the processor unit. The foot control unit contains a position sensor 27 that detects position relative to a reference unit 26 in the processor unit 10. A stream of relative position data is used to indicate alternative options at the information presentation device. Selection may be carried out by various alternative methods in different embodiments —if the position sensor 27 is also an orientation sensor, this may be by rotation of the foot. This arrangement is particularly suitable for a wearable computing apparatus.

11 Claims, 3 Drawing Sheets

FOOT ACTIVATED USER INTERFACE

FIELD OF INVENTION

The present invention relates to a user interface for a computing device, and is particularly relevant to wearable computing devices.

PRIOR ART

The most conventional user interface for a computing device is a combination of a keyboard and a pointing device, such as a mouse. This is an extremely appropriate combination for use on a desktop, either for a desktop personal computer or for a notebook computer used on a desktop. For other types of device, other user interfaces are more attractive. For a personal digital assistant (PDA), keyboards are used but a pen-based interface with handwriting recognition is a popular alternative. Speech recognition is a further alternative user interface. However, in other user contexts, none of these conventional user interfaces are wholly satisfactory. One such environment is wearable computing, particularly where it is desired that the computing device is unobtrusive and does not inhibit normal user interaction. Another such environment is while the user is performing a complex task requiring use of his or her hands and perhaps also voice, and is using the computing device for reference or technical support (for example, in aircraft maintenance). It is desirable to provide user interfaces for computing devices which are advantageous over the conventional alternatives for non-standard user environments.

SUMMARY OF INVENTION

Accordingly, the invention provides wearable computing apparatus, comprising: a processor; a device for presenting information from the processor to a user; and a device for providing user input to the processor in response to the information presented to the user, wherein the device is adapted to be activated wholly or partly by a foot of the user.

It is known to provide foot controls for desktop computers—either by adaptation of a conventional mouse (as described in U.S. Pat. No. 5,886,685), or by provision of a mouse adapted to be moved by the foot and wired to the desktop computer (the "NoHands Mouse" produced by Hunter Digital of 11999 San Vicente Blvd., Suite 440, Los Angeles, Calif. 90049). Use of foot pedals is also well known in the context of conventional word processing (often to start or stop dictation machines). However, none of the prior art solutions is adapted to a wearable computer, as opposed to a desktop computer provided with a fixed arrangement of peripherals.

Preferably, the user input device is adapted to select an item from a displayed list, or a point or an area from a displayed area, or an item from an audible list.

It is particularly preferred for the user input device to comprise a foot mounted position sensor, whereby translation of the position sensor with respect to a reference unit (which may be worn by the user—for example, on a user's belt) is measured as relative motion by the processor. This can be translated into relative motion across a display (either in one or two dimensions—optionally, only an appropriate dimension of the position sensor translation is measured). Selection may be achieved by translation in another dimension (eg vertically) or by another means. Preferably, the position sensor is also an orientation sensor, in which case selection or any other predetermined action (button press) can be carried out by rotation of the foot control unit beyond a threshold value.

In a further aspect, the invention provides computing apparatus, comprising: a processor; a display for presenting information from the processor to a user; and a user input device comprising a foot mounted position and orientation sensor, wherein translation of the foot mounted position sensor causes translation of a selection device across the display and rotation of the foot mounted position sensor causes a predetermined operation to be carried out by the processor in respect of information indicated by the selection device.

In a still further aspect, the invention provides a user input device for computing apparatus, comprising: a foot control unit adapted to be worn on a user's foot and comprising a position sensor for sensing relative position with respect to a reference unit; a reference unit remote from the foot control unit; and a data carrier containing program instructions for execution by a processor of said computing apparatus, wherein the processor executing said program instructions is adapted to receive a stream of relative position information from the foot control unit or the reference unit and to convert the stream of relative position information into a position of a selection element on a user display.

In a still further aspect, the invention provides a method of providing user input to a computing device, comprising: mounting a control unit on a foot of a user; providing signals indicating a position of the control unit relative to a reference unit not mounted with the control unit on the foot of the user; and representing changes in the relative position of the control unit and the reference unit as changes in data presented to a user on a data presentation device.

DESCRIPTION OF PREFERRED EMBODIMENTS

Specific embodiments of the present invention will now be described by way of example.

Figure 1:
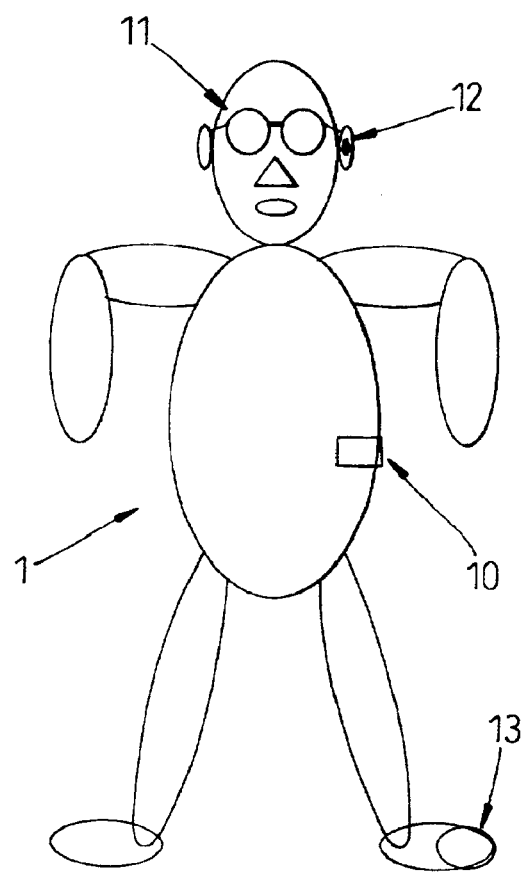
FIG. 1 shows a schematic representation of a user wearing a computing apparatus in accordance with an embodiment of the present invention.
Figure 2:
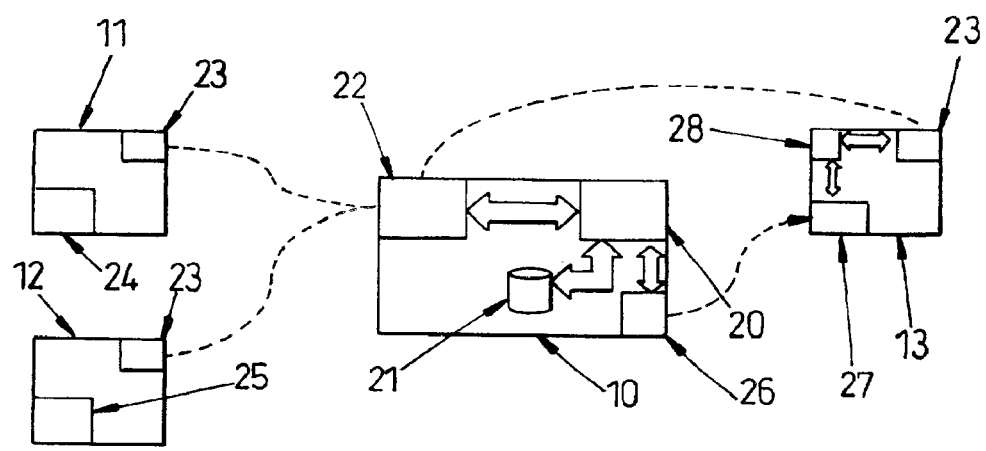
FIG. 2 shows a schematic diagram of the main functional elements of the computing apparatus of FIG. 1.

FIG. 1 shows a stylised representation of a user wearing a wearable computing apparatus according to an embodiment of the invention, and FIG. 2 shows the main functional elements of this apparatus. The processor 20 is contained within a processor unit 10, in this case worn on the body of the user (for example, mounted on a belt). Also contained in the processor unit 10 are a memory 21 and a communications control unit 22. Also contained within the processor unit 10, but not shown, will be such circuitry as is necessary to control or interact with the other system elements (such circuitry may include, for example, a video driver for a display)—the skilled person will readily appreciate what circuitry would be necessary for each such system element.

The wearable computing apparatus also comprises two separate devices for presenting information to a user. One of these elements is eyeglass display unit 11, comprising a communications unit 23 and a microdisplay 24. A variety of types of microdisplays are known—generally these occupy only a small part of the user's visual field, but by means of appropriate optical elements provide displayed information which appears to be of larger size but further away from the user. Appropriate microdisplays are known, and are commercially available from, for example: Colorado Microdisplay Inc. of 2477 55$^{th}$ Street, Boulder, Colo., 80301 USA; Displaytech, Inc. of 2602 Clover Basin Drive, Longmont, Colo. 80503-7603 USA; Displaywear Inc. of 831A Bransten Road, San Carlos, Calif. 94070 USA; and Tekgear Inc. of 1-90 Market Avenue, Winnipeg, Manitoba R3B 0PS Canada. The other information presenting element is an earpiece unit 12 containing a communications unit 23 and a speaker unit 25. Information can be provided to the user through the speaker unit 25 in the form of simulated speech created by appropriate software routines. Such speech synthesizers are known, examples including the following: Bell Labs Text to Speech Synthesis, provided by Lucent Technologies; and the Festival Speech Synthesis System of the University of Edinburgh. Speech synthesis would most logically be carried out at the main processor 20, but with digital to analogue conversion at the speaker unit 25. It will be understood that the eyeglass display unit 11 and the earpiece unit 12 will contain other components necessary to the normal function of such units: for example, the eyeglass display unit will typically contain a power source and a processor and may contain a video controller (if this is not present in the processor unit 12) and the earpiece unit 12 will typically contain a power source, a processor and a digital to analogue converter.

Different forms of communications units 22,23 can be employed in accordance with conventional or other approaches for connecting peripheral units with a main processor. A particularly appropriate approach for wearable computing apparatus is to use a short range wireless networking protocol such as Bluetooth (the Bluetooth specification is determined by the Bluetooth Special Interest Group). In this case, communications control unit 22 may be a Bluetooth master unit and communications units 23 may be Bluetooth slave units.

Foot control unit 13 and its interaction with the main processor 20 will now be described with reference to FIGS. 2 and 3. In a preferred embodiment, the foot control unit is an electromagnetic position sensor, such as those produced by Ascension Technology Corporation of PO Box 527, Burlington, Vt. 05402 USA (products such as Flock of Birds and Motion Star). Such products are typically used for motion tracking (for example, in recording movement of actors for subsequent animation). Sensor systems such as Flock of Birds operate by measuring position and orientation of one or more receiving antenna sensors with respect to a transmitting antenna, normally fixed in space. The transmitting antenna is driven by a pulsed DC signal. The receiving antenna measures the transmitted magnetic field pulse and the earth's magnetic field, with a microprocessor controlling transmitting and receiving elements and converting received signals into position and orientation inputs. An example of such a system is described in U.S. Pat. No. 4,945,305, which teaches a sensor adapted to return a position and orientation relative to a transmitter position. Numerous further such sensors, operating according to similar or different signalling regimes (such as AC electromagnetic and optical regimes) are available and could be employed for the present purpose by the person skilled in the art. Details of operation of such a position and orientation sensor are not the subject of the present invention and will not be described in greater detail herein—however, the skilled person will appreciate from the above references how to acquire or construct such a sensor. Alternative forms of sensor (for example, an optical sensor adapted to determine navigation across an arbitrary surface by recognition of variation in the surface, as discussed in the applicants' U.S. Pat. No. 5,578,813) can be employed in other embodiments of the invention.

When such DC-pulsed electromagnetic sensors are used for motion tracking, it is normal to fix the transmitting antenna in space. For embodiments of the present invention, there is no reason to do this as only relative motion is required (as is the case for a conventional tracking device such as a mouse) and it is effective to mount the transmitter unit 26 with the main processor 20. A suitable alternative would be to mount the transmitter unit 26 on the user's other foot—in that way, motion would be completely under the user's control, and the proximity of transmitter unit 26 and receiving unit 27 could allow use of lower power signals, reducing power demand on the computing apparatus as a whole. A transmitting antenna of transmitter unit 26 provides a signal received by receiving antenna of receiving unit 27 of foot control unit 13. A processor 28 of the foot control unit calculates the relative position and orientation of the receiving unit 27 relative to the transmitter unit 26 (or alternatively, simply collects data from the receiving unit 27 for subsequent calculation by the main processor 20) after compensation for the earth's magnetic field and returns relevant data to the main processor through communications unit 23. The main processor 20 is therefore able to calculate change in relative position and orientation of the receiving unit 27 relative to the transmitter unit 26 over time, as a stream of signals from the transmitter unit 26 leads to receipt of a stream of position and orientation signals from the receiving unit.

Figure 3:
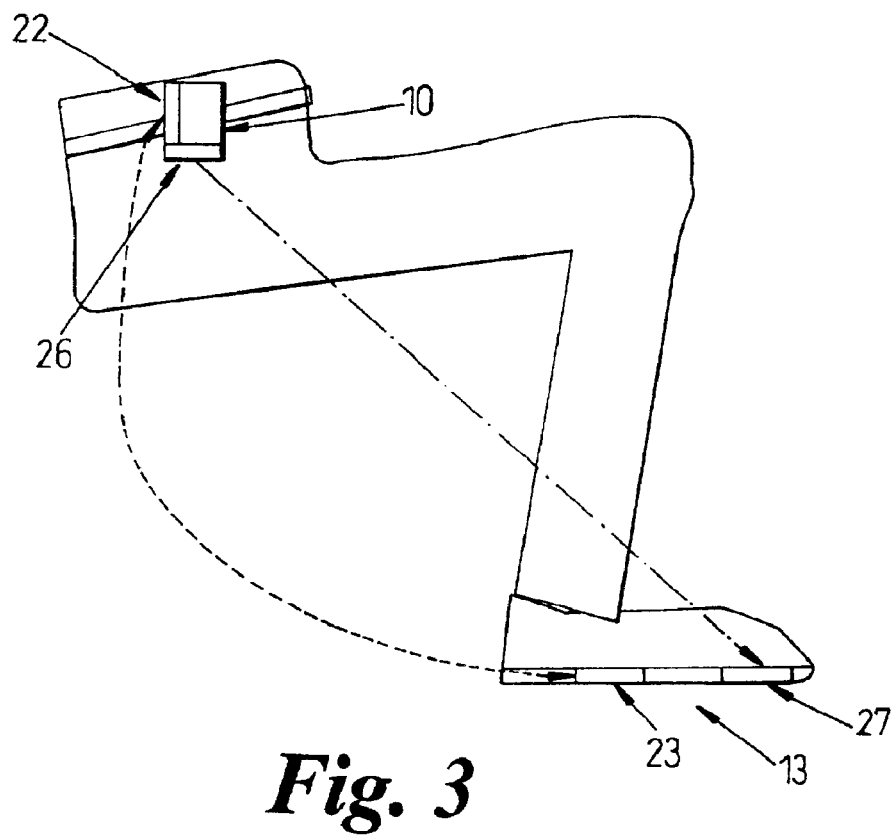
FIG. 3 indicates the methods of communication between a processor unit and a foot control unit for the computing device of FIG. 1.

While FIG. 3 shows operation of such a foot control unit 13 with the user in a sitting position, there is no constraint on the user to adopt any particular position—a foot control unit 13 of this type could equally well be used with the user in a standing position. While it will generally be more convenient for the user to be able to place one or both feet on the ground when using such a foot control unit 13, even this is not essential.

Figure 4:
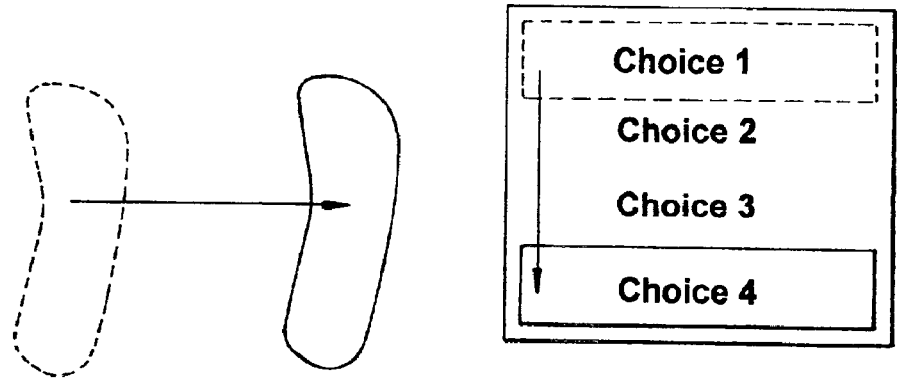
FIG. 4 indicates use of a foot control unit to select from a one-dimensional list.

Relative motion determined from position signals can be used as a method of obtaining user input in essentially the same manner as for translational motion of a conventional mouse. For selection from a one-dimensional list (as may be required in a visual interface or an audible interface), only one dimension of position need be used to indicate the item to be selected—for example, foot motion left or right in a horizontal plane (x-axis), but not vertical motion (z-axis) or motion up and down (y-axis) in the horizontal plane (see FIG. 4 for the case of a visual display—for an audible interface translational movement can cycle through a list of options in a similar manner). To select an item (rather than merely "point" to it) one of the other dimensions could be used—for example, a significant y-axis motion could indicate "selection" at that x-axis position. A further possibility is to use orientation information (as will be discussed below for two-dimension selection) or to use a separate mechanism, such as a hand-activated button, for actual selection.

Figure 5A:
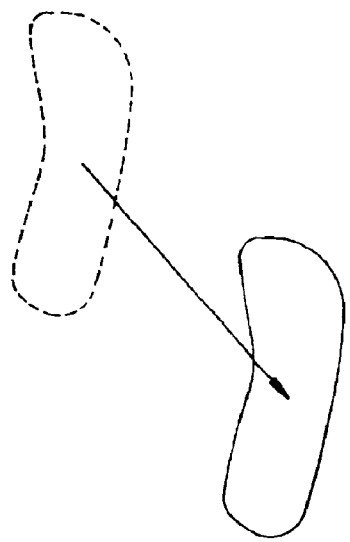
FIGS. 5A and 5B indicates use of a foot control unit to position a pointer within an area and select an item at the pointer position.
Figure 5A:
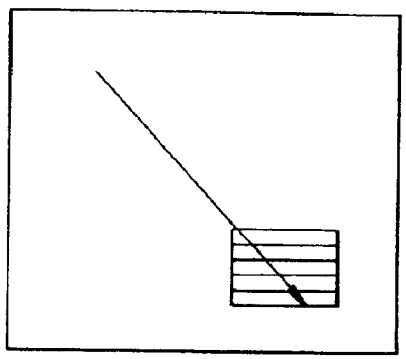
Figure 5B:
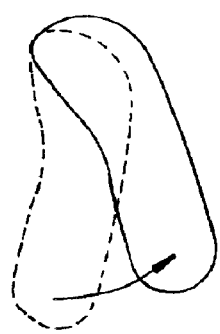
Figure 5B:
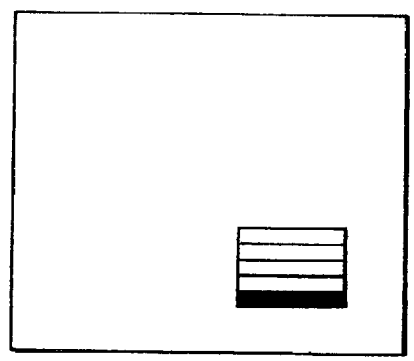

Two-dimensional selection can operate in very much the same manner as a conventional mouse (and would be the normal approach to use for a visual interface). In this case, motion of the foot anywhere in the horizontal plane would translate to motion in that plane in essentially the same manner as a conventional mouse. One possibility for selection may be to use the vertical dimension (lift the foot off the ground, or tap the toe or heel)—however, more positional accuracy may be provided by use of the orientation sensors, and detecting rotation of the foot (for example, an anticlockwise rotation of the foot by 30 degrees or more could indicate a right click and a similar clockwise rotation a left click for an equivalent mouse)—rotation about the toe is likely to lead to greater positional accuracy than rotation around the heel. FIG. 5A shows an example of translation of the user's foot to translate a pointing device and so indicate an item for selection, and FIG. 5B shows the act of selection by rotation of the user's foot. Further features of a conventional mouse in conventional operating systems, such as selecting an area, can be replicated in much the same way as for a conventional mouse by dragging the foot across the ground in a "left-clicked" or "right-clicked" foot position. A preferred use for movement in the z-direction is to allow repositioning of the foot without "dragging" the selection device (in the same manner as lifting and replacing a conventional mouse)—however, an issue associated with this is to ensure that the foot control unit "knows" when to restart translational motion of the pointing device. One approach would be disable translational motion of the pointing device when relative motion in the z-direction exceeds a predetermined value, and to re-enable the translational motion of the pointing device on a "click"—such as a rotation of the foot and hence the foot control unit above a threshold value. The user could then reposition his or her foot and rotate it to re-activate the tracking action—this allows the user to use the mouse in a preferred area of greatest sensitivity, or on a particularly suitable surface.

A foot control unit as described above can be used effectively in a range of otherwise difficult user contexts. If the computing apparatus is intended not to affect normal user movement and interaction, use of the foot (which plays no part in normal user interaction) can allow free use of normal person-to-person communication by means of voice, facial gesture or manual gesture. If the computing apparatus is to provide technical support for a user conducting an engineering task, use of the foot for user interface control allows the user full use of hands and senses where not occupied by the presentation of information to the user.

A "foot mouse" of the type operates according to relative motion between the foot control unit and a reference unit. The reference unit will be worn by the user for wearable computer apparatus, but may be retained on the desktop (as for a normal peripheral) or may be mounted within a notebook computer. A pointing and selecting device of this type may be advantageous not only for a wearable computing apparatus, but also for a conventional desktop computer. As a foot control unit of this type can be worn by, rather than simply operated by, a user's foot, there is greater potential for more rapid and natural use.

What is claimed is:

1. A user input device for computing apparatus, comprising:

a foot control unit adapted to be worn on a user's foot and comprising a position sensor for sensing relative position with respect to a reference unit;

a reference unit remote from the foot control unit; and a data carrier containing program instructions for execution by a processor of said computing apparatus, wherein the processor executing said program instructions is adapted to receive a stream of relative position information from the foot control unit or the reference unit and to convert the stream of relative position information into a position of a selection element on a user display.

2. A user input device as claimed in claim 1, wherein the program instructions cause the processor to be adapted to interpret predetermined changes in relative position information as a selection event for the selection element.

3. A user input device as claimed in claim 1, wherein the position sensor is also an orientation sensor, and wherein the data structure is adapted to interpret predetermined changes in relative orientation as a selection event for the selection element.

4. A method of providing user input to a computing device, comprising:

mounting a control unit on a foot of a user;

providing signals indicating a position of the control unit relative to a reference unit not mounted with the control unit on the foot of the user; and representing changes in the relative position of the control unit and the reference unit as changes in data presented to a user on a data presentation device.

5. A method as claimed in claim 4, wherein said changes in relative position determined include a translation of the control unit relevant to the reference unit.

6. A method as claimed in claim 5, wherein said translation is determined in a plane defined relative to the control unit or the reference unit.

7. A method as claimed in claim 6, wherein translation normal to said plane is detected and compared with a predetermined threshold, and translation exceeding said threshold is determined to be a selection event.

8. A method as claimed in claim 4, wherein said presentation device is a display, and said translation is represented by a translation of a cursor across said display.

9. A method as claimed in claim 4, wherein said presentation device is a loudspeaker, and said translation is represented by movement through a list of menu options and playing of a relevant menu option.

10. A method as claimed in claim 4, wherein said position indicating signals comprise signals indicating a relative orientation of the control unit and the reference unit, and said changes in relative position determined include a change in relative orientation of the control unit and the reference unit.

11. A method as claimed in claim 10, wherein a change in relative orientation in excess of a predetermined criterion is interpreted as a selection event.

* * * * *